United States Patent [19]

Richter et al.

[11] 4,354,777
[45] Oct. 19, 1982

[54] HIGH PRESSURE FEEDER DEFLECTION PREVENTION

[75] Inventors: Johan C. F. C. Richter, Nice, France; Jens Ramstad, Oslo, Norway

[73] Assignee: Kamyr, Inc., Glen Falls, N.Y.

[21] Appl. No.: 192,032

[22] Filed: Sep. 29, 1980

[51] Int. Cl.$^3$ .................... B65G 53/30; B65G 53/46
[52] U.S. Cl. ................ 406/63; 37/DIG. 8; 406/105
[58] Field of Search ............ 406/62, 63, 64, 105, 406/67; 37/DIG. 8

[56] References Cited

U.S. PATENT DOCUMENTS 3,753,303  8/1973  Holzenberger et al. ........ 37/DIG. 8
3,982,789  9/1976  Funk ................................. 406/63 X
4,082,368  4/1978  Funk ................................. 406/63 X Primary Examiner—Jeffrey V. Nase
Attorney, Agent, or Firm—Cushman, Darby & Cushman

[57] ABSTRACT

A high pressure transfer device and method of continuously conveying hard particulate material using the high pressure transfer device ensure proper operation even under high pressure differential. The high pressure transfer device includes a pocketed rotor containing through-going pockets and a housing enclosing the rotor and having ports disposed around the exterior periphery of the housing. A structure, such as first and second jacket portions, is provided for applying a radially inwardly directed force to the housing exterior periphery roughly proportional to and opposite a force tending to deflect the housing radially outwardly so that significant deflection of the housing is prevented. The force application structure generally applies a force proportional to the pressure of high pressure liquid entering the transfer device. Such a force applicator structure may be a piston and cylinder arrangement, or bellows arrangement, with a pair of force transmitting rods interconnecting the jacket portions. The transfer device is normally mounted for rotation about a vertical axis, and deep underwater.

22 Claims, 8 Drawing Figures

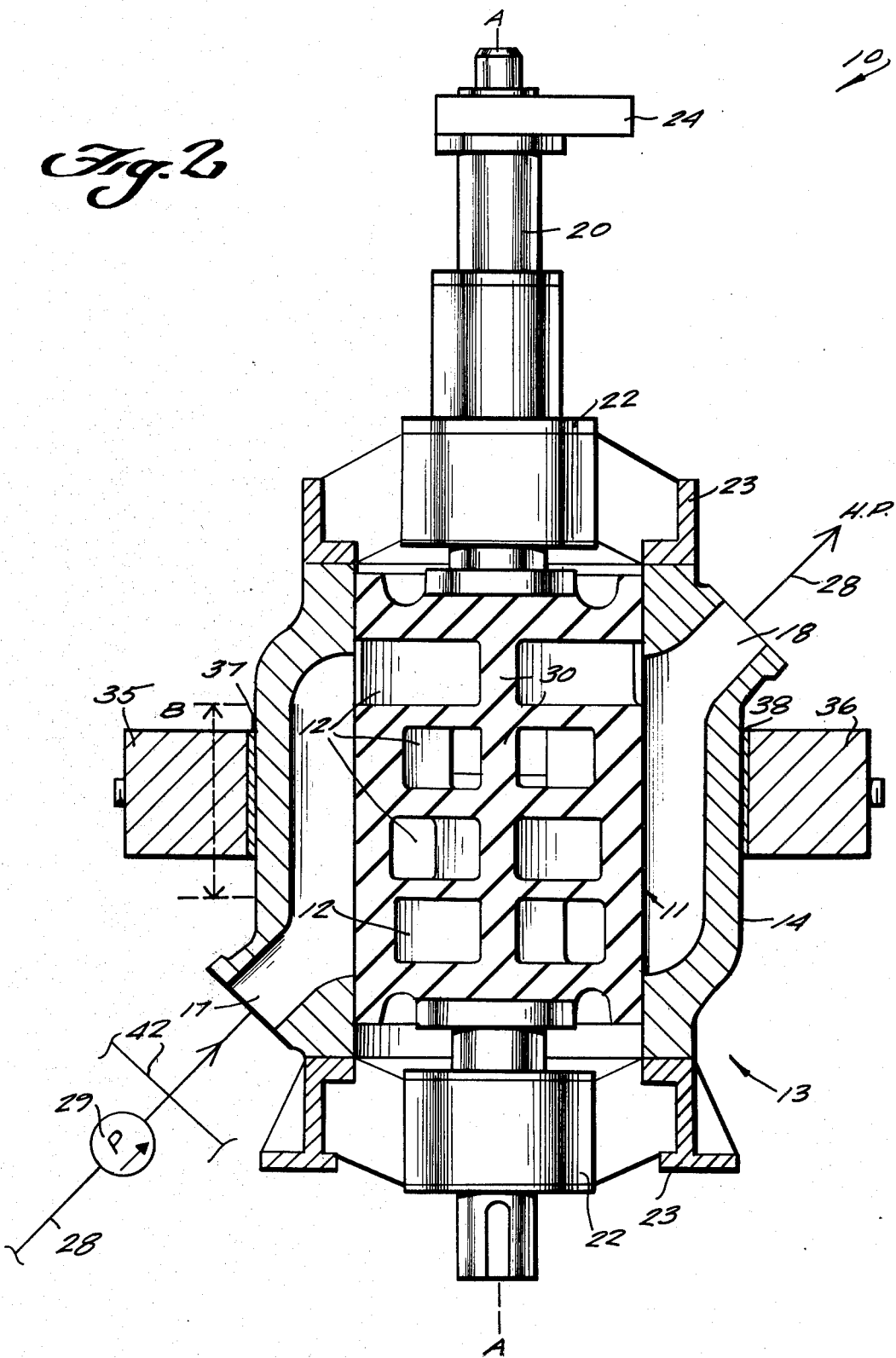

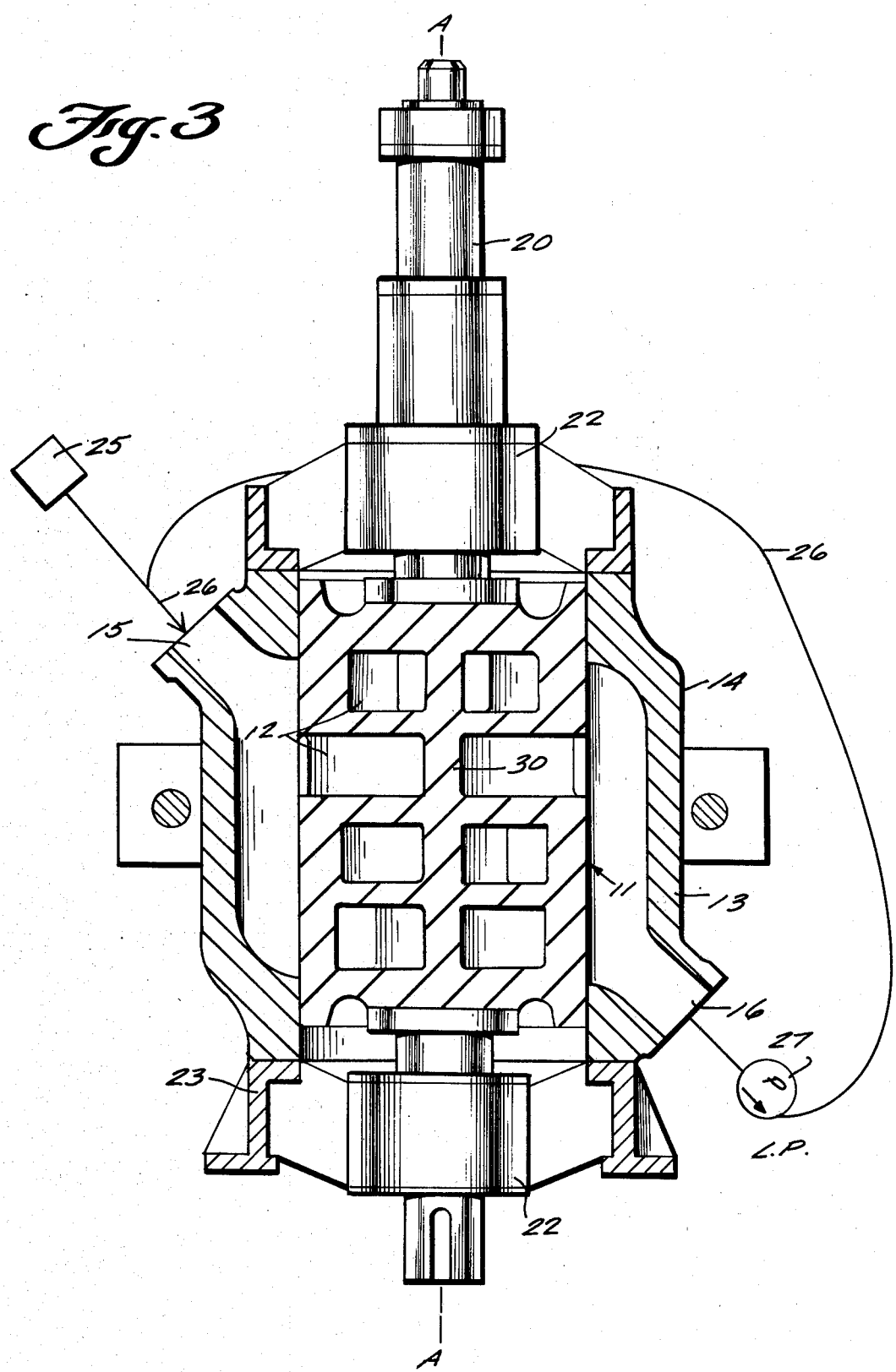

HIGH PRESSURE FEEDER DEFLECTION PREVENTION

BACKGROUND AND SUMMARY OF THE INVENTION

The invention relates to a high pressure transfer device especially adapted for use at very high pressure differentials (e.g. 50 to 100 bars), such are encountered when pumping up hard particulate material (such as manganese nodules) from an ocean floor (e.g. 15,000 feet below sea level) to the surface, and a method for utilizing such a device for continuously conveying such hard particulate material under such circumstances.

Conventional high pressure transfer devices, such as shown in U.S. Pat. No. 4,082,368 (the disclosure of which is hereby incorporated by reference herein) perform very well at most relatively small pressure differentials. For instance, at pressure differences of 8 to 20 bars, which are conventionally encountered when such devices are used in conjunction with pulp digesters, little problems result. Nor do many problems result at pressures conventionally encountered conveying coal, oil shale, mineral ores, etcetera from the face to the surface of underground mines as provided in U.S. Pat. No. 4,082,368. However when utilized at extremely high pressure differentials (e.g. 50 to 100 bars) such as are encountered in pumping manganese nodules and like hard particulate material from the ocean floor to the surface, the housing for the high pressure transfer device has a tendency to deflect outwardly, resulting in unacceptable leak volume so that the device cannot adequately perform its intended function. Such outward deflection also results in inward deflection of other portions of the housing, which may actually cause binding of the rotor.

Attempts to "beef up" the construction of the housing to prevent deflection, or to otherwise compensate for the deflection, have not been successful. The deflection problem is compounded by the fact that the differential pressure may be 100 bars when a column of nodules is being conveyed to the surface, but just 10 to 20 bars when the feeder is idling.

According to the present invention, a high pressure transfer device, and method of utilization thereof to transport hard particulate material under very high pressure conditions, are provided which overcomes the deflection problem inherent in prior art high pressure transfer devices.

The apparatus according to the present invention includes the conventional components of: A pocketed rotor containing a pair of diametrically through-going pockets perpendicular to each other with the housing enclosing the rotor. The housing has an exterior periphery and has four ports disposed around the periphery for registry with inlets to and outlets from the pockets. Means are provided for rotating the rotor in the housing with respect to the ports about a given axis of rotation, and screen means are associated with the device for screening particulate material above the predetermined size out of the liquid passing through at least one of the ports. In order to prevent deflection of the housing, according to the present invention means are provided for applying a radially inwardly directed force to the housing exterior periphery roughly proportional to a force tending to deflect the housing radially outwardly, so that significant deflection of the housing is prevented. Thus, the device may operate at high pressure with an acceptably low level of leakage to convey hard particulate material under high pressure, yet will adjust to widely varying pressure conditions (e.g. 10 bars to 100 bars).

The means for applying a force to the housing preferably comprises means for applying a force proportional to a pressure of the liquid entering the high pressure inlet port of the housing. One form that the structure can take is a jacket comprising first and second jacket portions operatively engaging a central belt portion of the housing on opposite sides thereof. At least one pressure responsive force applicator (such as a piston and cylinder arrangement, or bellows arrangement) is associated with the first jacket portion, and force transmitting means (such as a pair of rods) interconnect the jacket portions so that the force applicator structure applies a force to both the jacket portions tending to bias the jacket portions toward each other (although no actual relative movement takes place).

In practicing the method of the invention for continuously conveying hard particulate material under high pressure the liquid containing the hard particulate material is fed into a first of the housing ports for entry into a through-going pocket of the rotor. The rotor is rotated in its given direction of rotation so that it progressively rotates past each of the housing ports while withdrawal of liquid introduced through the first port is provided through a third port, opposite the first port while screening of the particulate material above a predetermined size out of the liquid passing through the third port takes place. Liquid under high pressure is pumped toward the rotor through a fourth port of the housing located before the first port in the direction of rotation of the rotor, and between the first and third ports, while withdrawal of the liquid with entrained hard particulate material from a through-going pocket takes place through a second port, located opposite the fourth port. A radially inwardly directed force is applied to the housing exterior periphery roughly proportional to a force tending to deflect the housing radially outwardly adjacent the second and fourth ports so that significant deflection of the housing is prevented, the radially inwardly directed force preferably being proportional to the pressure of the liquid entering the housing fourth port. The high pressure transfer device is preferably mounted deeply underwater and disposed so that the axis of rotation of the rotor is substantially vertical. The method is practiced to transport hard particulate material under high pressure even from an ocean bottom at, for example, 15,000 feet, with a pressure difference of about 50 to 100 bars.

It is the primary object of the present invention to provide a high pressure transfer device, and method of conveying hard particulate material (such as from an ocean bottom) utilizing the high pressure transfer device, so that the device will successfully operate at very high pressure differentials, as well as at relatively low idling pressure differentials. This and other objects of the invention will become clear from an inspection of the detailed description of the invention, and from the appended claims.

BRIEF DESCRIPTION OF THE DRAWINGS

FIG. 2 is an end view, partly in cross-section and partly in elevation, taken along lines 2—2 of FIG. 1;

FIG. 3 is an end view like FIG. 2 only taken along lines 3—3 of FIG. 1;

FIG. 4 is a view like FIG. 1 only showing an alternative construction of the transfer device housing;

DETAILED DESCRIPTION OF THE DRAWINGS

Figure 1:
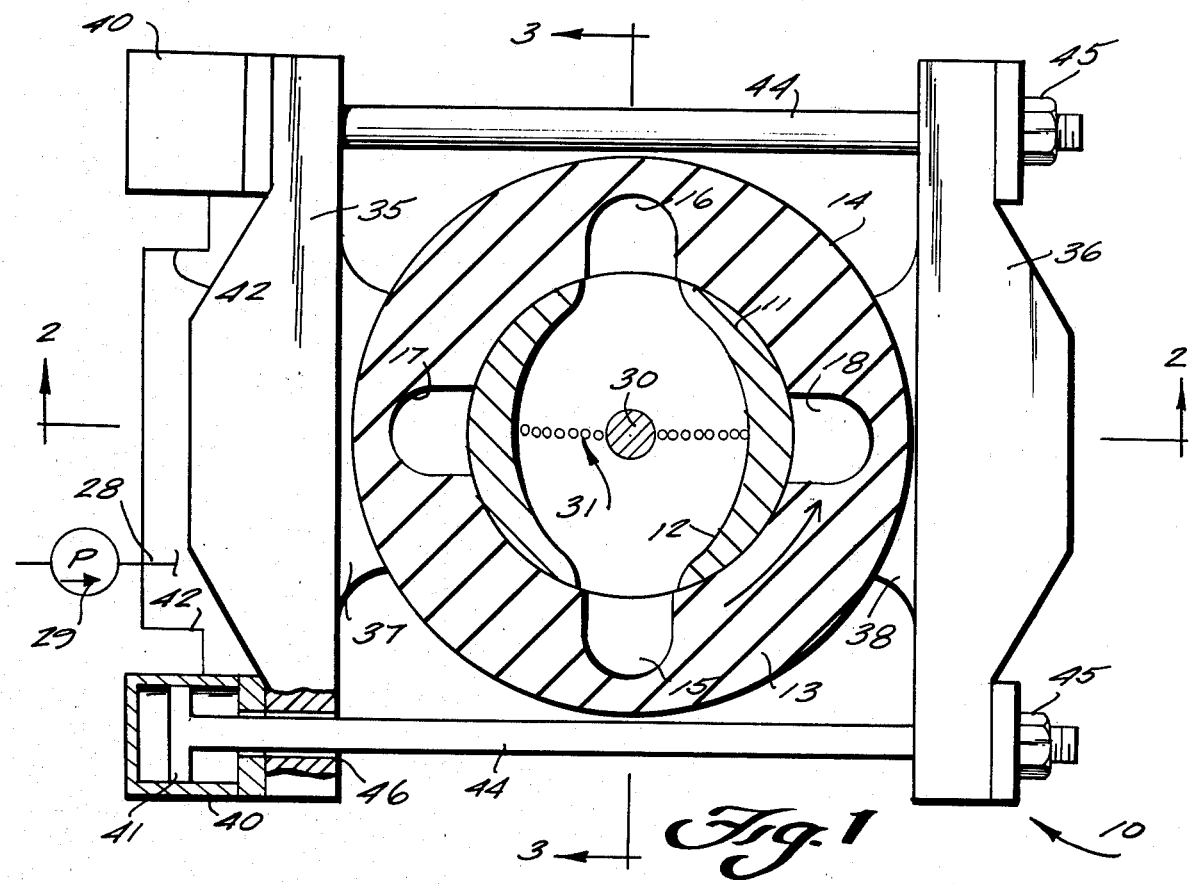
FIG. 1 is an end view, partly in cross-section, and partly in elevation, of an exemplary high pressure transfer device according to the invention, including a structure for applying a radially inwardly directed force to the transfer device housing.
Figure 1:
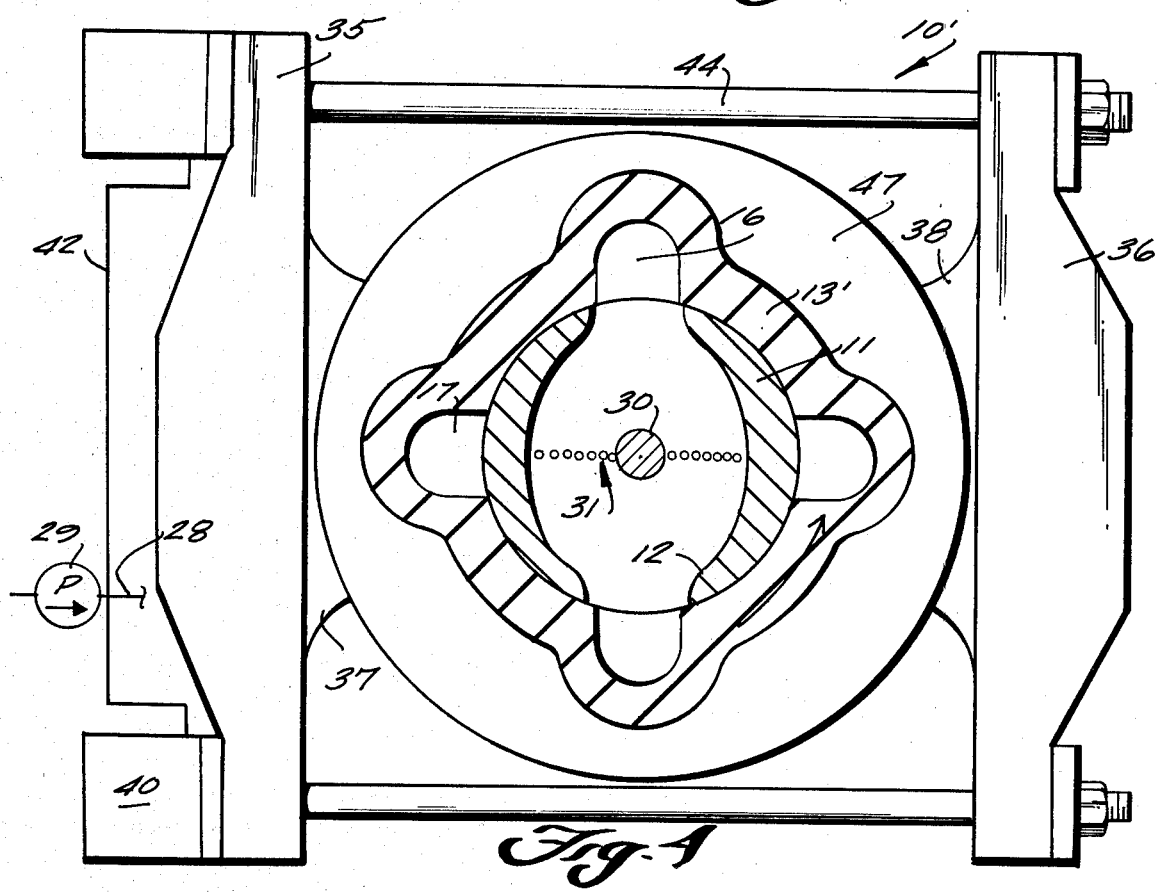

An exemplary high pressure transfer device according to the present invention is shown generally at 10 in FIGS. 1 through 3. The device includes the conventional high pressure transfer device components of a pocketed rotor 11 containing a pair of diametrically through-going pockets 12 perpendicular to each other (two rows of diametrically through-going pockets are illustrated in the embodiment in the drawings, the two rows of pockets being parallel with one row being 45° displaced peripherally from its adjacent row), and a housing 13 enclosing the rotor. The housing has an exterior periphery 14 and has four ports 15 through 18 disposed around the exterior periphery 14 of the housing for registry with inlets to and outlets from the pockets 12. The rotor 11 is mounted for rotation about an axis A—A by a shaft 20, which may be journalled in bearings 22 at either end of the housing 13, operatively connected to the housing 13 by brackets 23 or the like (see FIGS. 2 and 3). A powered belt 24, or any other suitable structure, is provided as a means for rotating the shaft 20, and the rotor 11 connected thereto, in a given direction of rotation.

In operation of the device 10, liquid with entrained hard particulate material (such as manganese nodules entrained in liquid at the ocean floor) is pumped from source 25 through low pressure line 26 to a first port 15 of the housing 13. The low pressure line 26 continues from a third port 16 on the opposite side of the housing 13 as the first port 15, with the low pressure pumping pressure being provided by pump 27 (see FIG. 3). The high pressure fluid transfer path of the device 10 includes (see FIG. 2) the line 28 which enters a fourth port 17 of the housing 13, and is withdrawn through a second port 18 of the housing 13, opposite the fourth port 17. A high pressure pump 29 provides the motive force for the liquid in the line 28. The line 28 may obtain liquid directly from the ocean when the device 10 is mounted on or adjacent the ocean floor, while the line 28 extends from the port 18 up to the surface.

The device 10 further includes screen means for screening particulate material above a predetermined size out of the liquid passing through at least one of the ports 15 through 18. Preferably, the screen means take the form of an interiorally mounted screen 31, which may be associated with an interior rib 30 disposed within each pocket 12, the interior ribs 30 providing additional support to maintain the integrity of the rotor 11 when they are utilized. As indicated in the drawings, preferably the pockets 12 are straight (extend straight through the rotor 11), and are widened at an interior portion thereof, the screen 31 being mounted at the widened interior portion. The screen 31 may take the forms shown in copending U.S. application Ser. No. 123,947 filed Feb. 25, 1980, the disclosure of which is hereby incorporated by reference herein.

During operation of the device 10, the hard particulate material entrained in the liquid passing from line 26 into port 15 is screened out by the screen 31 in each of the pockets 12, while the liquid passes through the screens 31 and subsequently to outlet port 16. High pressure liquid supplied to inlet 17 flushes the hard particulate material out of the pockets 12 as the pockets are rotated into operative communication with port 17, the hard particulate material being entrained in the liquid as it exits outlet port 18 and is subsequently conveyed to the surface. When the pressure of the liquid being supplied to port 17 is very high relative to that in the low pressure loop 26 (e.g. 50 to 100 bars pressure differential), the housing 13 will have a tendency to deflect radially outwardly, particularly at the high pressure ports 17, 18. This radially outward deflection will cause excessive leakage, and also may even result in the housing being deflected inwardly at the area surrounding the low pressure ports 15, 16 thereof, which may even result in forced engagement of the rotor 11 by the housing 13 causing excessive wear of the rotor 11, or even stopping it from rotation.

According to the present invention, the housing-deflection described above is prevented so that the device 10 can successfully operate. This is accomplished by providing means for applying a radially inwardly directed force to the housing exterior periphery 14 roughly proportional to and opposite the force tending to deflect the housing radially outwardly so that significant deflection of the housing 13 is prevented. Preferably such means for applying a force comprise means for applying the force proportional to the pressure of the liquid entering the high pressure inlet port 17. The exemplary components illustrated in the drawings for practicing the invention include first and second jacket portions 35, 36 respectively, each having a portion 37, 38 respectively thereof for directly engaging the housing exterior periphery 14 on opposite sides of the housing 13, and at the general area of the high pressure ports 17, 18. Because of the particular construction of the housing 13 in the preferred embodiment of the device 10 illustrated in the drawings, a central belt portion B (see FIG. 2) is provided which extends around the entire circumference of the housing 13, with the ports 15 through 18 being located on either side of the belt portion B. The portions 37, 38 of the jacket portions 35, 36 engage the housing at the central belt portion B (see FIGS. 1 and 2). The actual area of engagement of the housing exterior periphery 14 may be any amount that produces the desired results. Preferably the force is concentrated at the middle portion of the housing 13, with respect to the axis A—A, although it may be applied across the entire width of the belt portion B.

In addition to the jacket portions 35, 36, the force applying means further comprises at least one pressure responsive force applicator associated with the first jacket portion 35, and force transmitting interconnecting the jacket portions so that the at least one pressure responsive force applicator structure applies a force to both jacket portions tending to bias the jacket portions toward each other (although no actual relative movement occurs). In the embodiment illustrated in FIGS. 1 through 3, the pressure responsive force applicator structure comprises a pair of fluid cylinders 40 mounted on portions of the first jacket portion 35 opposite the second jacket portion 36, and on opposite sides of the housing exterior periphery 14, with a piston 41 associated with each of the cylinders 40. Fluid under high pressure is supplied via lines 42 directly to the piston/cylinder arrangement 40, 41, the lines 42 being directly connected to the outlet of the pump 29 which controls the pressure of liquid supplied to the port 17. The force transmitting means in this embodiment comprises a pair of rods 44, each rod rigidly connected at one end thereof to the second jacket portion 36 (as by nuts 45), and rigidly connected to the piston 41 at the other end thereof, each rod 44 extending through a sleeve 46 in the first jacket portion 35.

Many variations of the various components are possible while still accomplishing the results desired according to the present invention. For instance, instead of providing the housing 13 as relatively thick-walled (as indicated in FIGS. 1 through 3), the transfer device 10' of FIG. 4 may be provided with a relatively thin-walled housing 13'. In this embodiment, the housing further comprises a plurality of reinforcing ribs 47 circumferentially extending around the housing central belt portion B, with the portions 37, 38 of the jacket portions 35, 36 directly engaging the reinforcing ribs 47. As in the FIGS. 1 through 3 embodiment, where the ribs 47 are circular, the engaging surfaces of the portions 37, 38 are curved to correspond to the curvature of the ribs 47.

Figure 5:
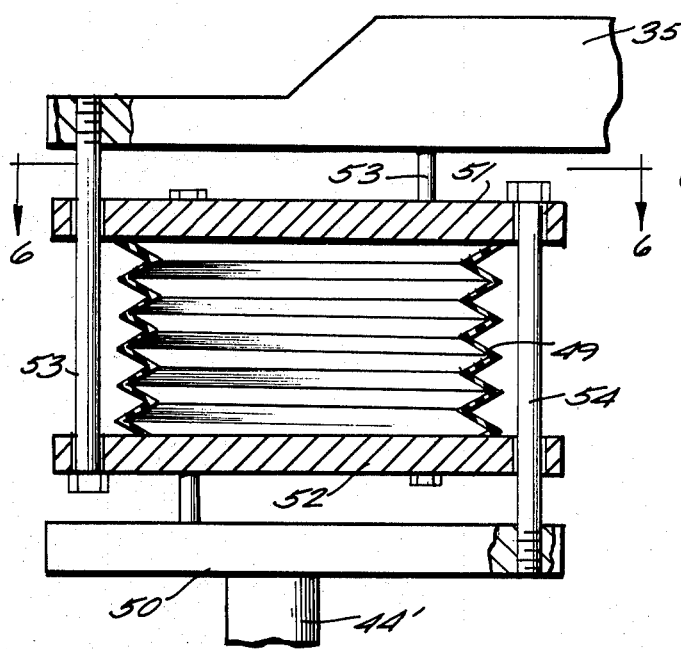
FIG. 5 is a detail view, partly in cross-section and partly in elevation, of an alternative force application structure, taken along lines 5—5 of FIG. 6.
Figure 6:
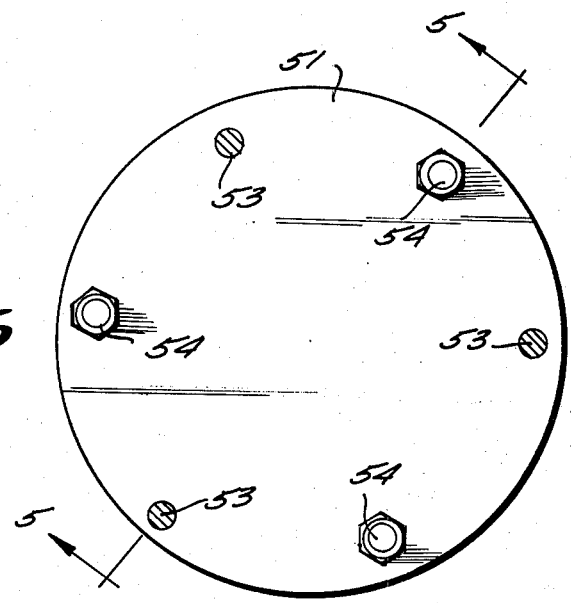
FIG. 6 is an end view of the force applicator structure of FIG. 5 taken along lines 6—6 thereof.

An alternative form of force applicator structure is illustrated in FIGS. 5 and 6. In this embodiment a pair of bellows 49 (one operatively associated with each end of the first jacket portion 35) are provided, associated with force transmission rods 44'. The rods 44' are connected at one end thereof to the second jacket portion 36 in the same manner as the rods 44' are connected in the FIGS. 1 through 3 embodiment, however instead of passing through a sleeve in the first jacket portion 35, the rods 44' each are integral with a plate 50. The plate 50 is parallel to the interior surface of the jacket portion 35 with the bellows 49 mounted therebetween. Each bellows 49 is connected at one end thereof to a plate 51, and to the other end thereof to a plate 52. Bolts 53 interconnect the plate 52 and jacket portion 35, while bolts 54 interconnect the plate 51 and plate 50. When the fluid under high pressure is supplied to the interior of the bellows 49 via a pressure line 42, the bellows exert a force tending to draw the plate 50 toward the jacket portion 32, which results in the desired biasing force.

Figure 7:
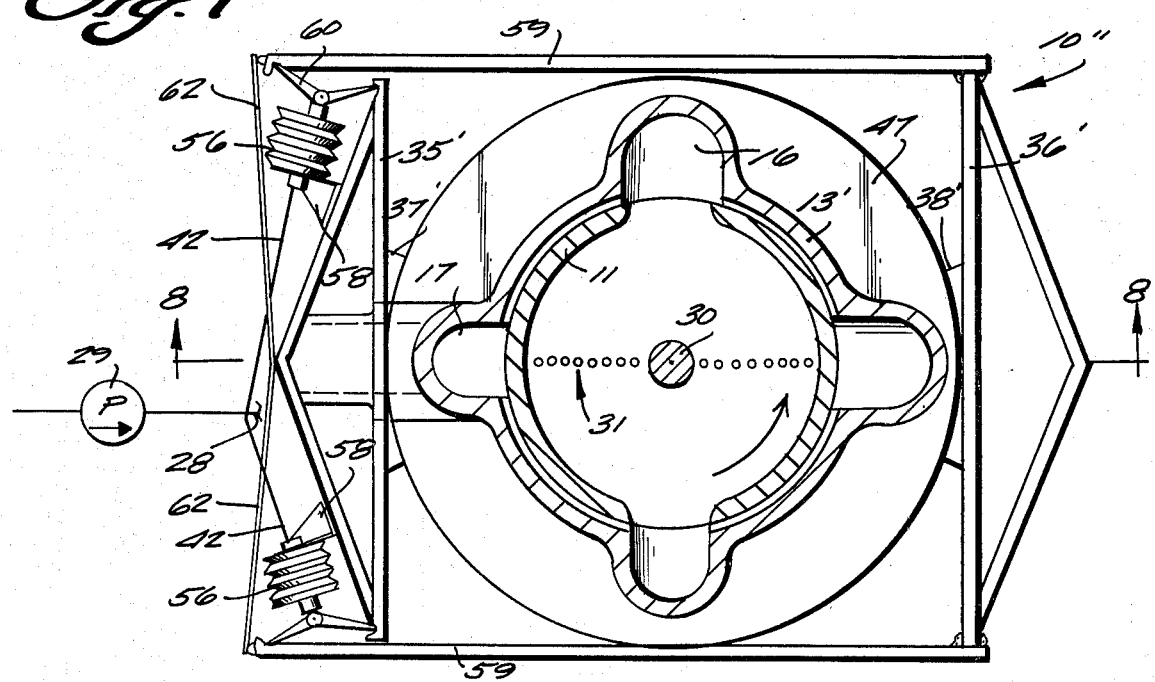
FIG. 7 is an end view, partly in cross-section and partly in elevation, of a high pressure transfer device according to the present invention showing another modified form of force applicator structure, taken along lines 7—7 of FIG. 8.

The embodiment of the transfer device 10" illustrated in FIG. 7 includes the housing 13' with circumferential ribs 47 as in FIG. 4 embodiment, but comprises a still further modification of the force application structure. Bellows 56 are provided as the actual force transmission means, fluid being supplied to the bellows 56 through lines 42, tending to elongate the bellows. The first and second jacket portions 35', 36' are constructed so that the first jacket portion 35' mounts one end of each of the bellows 56 stationarily thereto, such as by utilizing brackets 58. The force transmission means include the strips 59, rigidly mounted at one end thereof to the second jacket portion 36', and engaged at the other end thereof by a force transmitting component 60 acting between the strip 59 and an end of the jacket portion 35' and biased by the bellows 56. Spring leaves 62 may be provided to maintain the components in proper orientation.

Figure 8:
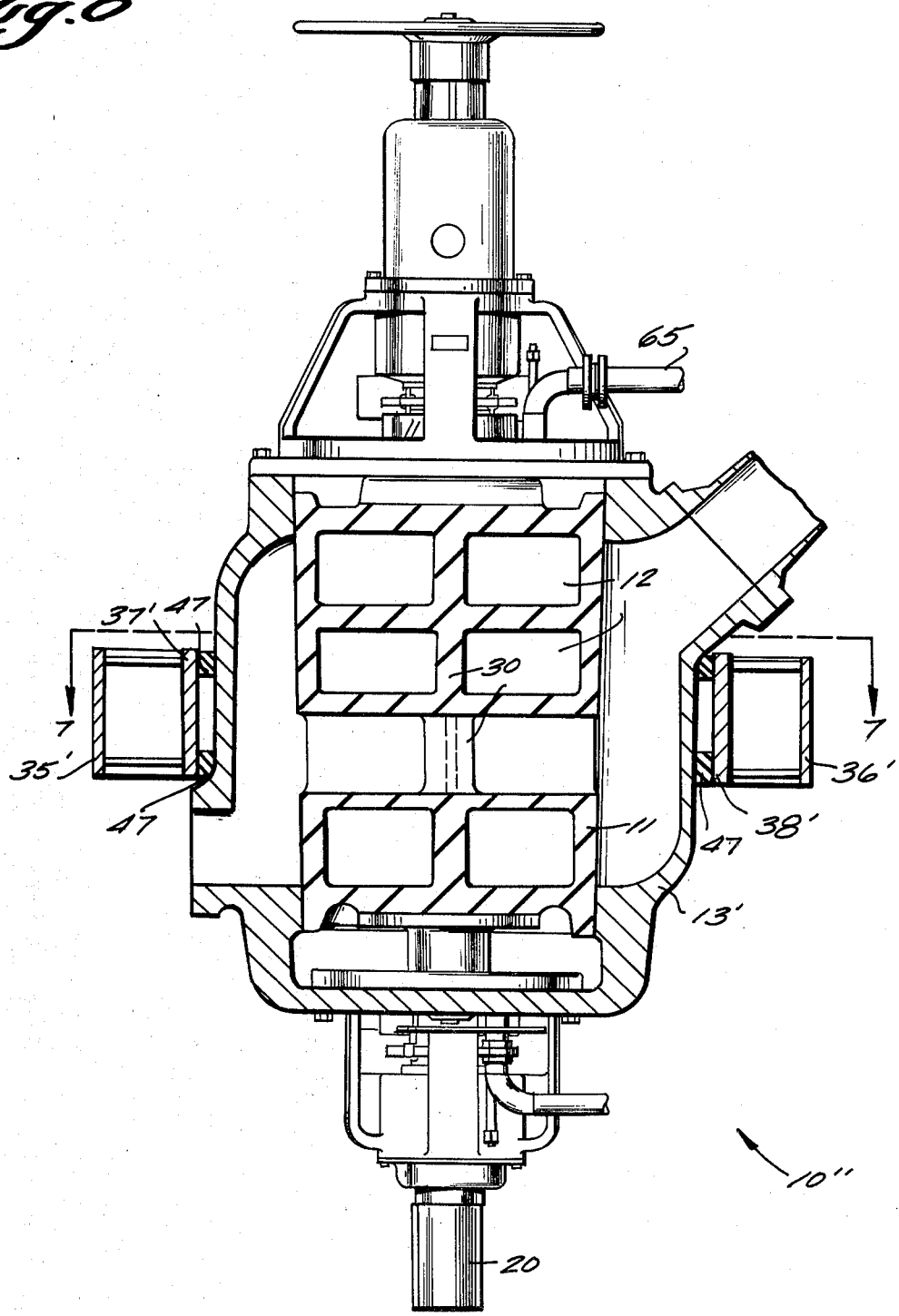
FIG. 8 is a side view, partly in cross-section and partly in elevation, of the device of FIG. 7 taken along lines 8—8 thereof.

As illustrated in FIG. 8, leakage drawn from the low pressure circulation loop via pipe 65 may be fed to the high pressure pump 29.

Operation

Utilizing the high pressure device 10 (or 10' or 10") according to the present invention, a method of continuously conveying hard particulate material (such as manganese nodules from an ocean floor) may be provided. Liquid containing the hard particulate material is fed from source 25 into the first housing port 15 for entry into a through-going pocket 12 of the rotor 11 which is in registry with the port 15 at the time while the rotor 11 is rotated in a given direction of rotation so that it progressively rotates past each of the housing ports 15 through 18. Pump 27 provides a motive force for withdrawing liquid introduced through the first port 15 from the third port 16 while the particulate material above a predetermined size is screened out of the liquid, while in a pocket 12, by the screen means 31. A low pressure circulation loop is provided by line 26. Liquid under high pressure is supplied by pump 29 to port 17 to enter a pocket 12 which has been rotated into communication therewith, flushing the hard particulate material within the pocket out through the second port 18, and through line 28 ultimately up to the surface. The pump 29 also supplies liquid under pressure through lines 42 to a force application structure (e.g. 40, 41, or 49, or 56).

Liquid under pressure in lines 42 supplied to piston-cylinder arrangements 40, 41 supplies a force to force transmitting rods 44 tending to bias jacket portions 35, 36 toward each other. This bias applies a force to the housing exterior periphery 14 at the area surrounding the high pressure ports 17, 18, which prevents outward deflection of the housing 13 at those areas.

It will thus be seen that according to the present invention a simple, advantageous, and effective structure and method have been provided which allow conveyance of hard particulate material, or the like, by a high pressure transfer device even under extremely high pressure differential conditions (e.g. 50 to 100 bars), while not adversely affecting operation while the transfer device is idling (e.g. at a pressure differential of 10 to 20 bars). While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent structures and methods.

What is claimed is:

1. A high-pressure transfer device including: a pocketed rotor containing a plurality of diametrically through-going pockets, said rotor rotatable about an axis; a housing enclosing said rotor for rotation with respect to said housing, said housing having an exterior periphery and having four ports disposed around the exterior periphery thereof for registry with inlets to and outlets from said through-going pockets; means for rotating said rotor in said housing with respect to said ports about said axis of rotation, and in a given direction; screen means for screening particulate material above a predetermined size out of the liquid passing through at least one of said ports; and means for applying a radially inwardly directed force to said housing exterior periphery roughly proportional and opposite to a force tending to deflect the housing radially outwardly so that significant deflection of the housing is prevented.

2. A device as recited in claim 1 wherein one of said ports comprises a high-pressure inlet port, and one of said ports comprises a high-pressure outlet port, for receipt and discharge of liquid under high pressure; and wherein said means for applying a force to said housing comprises means for applying a force to said housing proportional to the pressure of the liquid entering said high-pressure inlet port.

3. A device as recited in claim 2 wherein said housing exterior periphery comprises a central belt portion and wherein said four ports are located on either side of said central belt portion, and wherein said means for applying a force to said housing comprises a jacket comprising first and second jacket portions for operatively engaging said housing belt portion on opposite sides thereof.

4. A device as recited in claim 3 wherein said force applying means further comprises at least one pressure-responsive force-applicator associated with said first jacket portion, and force transmitting means interconnecting said jacket portions so that said at least one pressure-responsive force-applicator structure applies a force to both said jacket portions, tending to bias said jacket portions toward each other.

5. A device as recited in claim 4 wherein said at least one pressure-responsive force-applicator structure comprises a pair of fluid cylinders mounted on portions of said first jacket portion opposite said second jacket portion and on opposite sides of said housing exterior periphery, and a piston associated with each of said cylinders; and wherein said force transmitting means comprises a pair of rods, each rod rigidly connected at one end thereof to said second jacket portion, and rigidly connected to a said piston at the other end thereof.

6. A device as recited in claim 4 wherein said at least one pressure-responsive force-applicator structure comprises a pair of bellows operatively mounted to portions of said first jacket portion opposite said second jacket portion and on opposite sides of said housing exterior periphery, and wherein said force transmitting means comprises a pair of rods, each rod rigidly affixed at one end thereof to said second jacket portion, and means for rigidly operatively affixing each rod at the other end thereof to a said bellows.

7. A device as recited in claim 3 wherein said housing has relatively thick walls, and wherein said jacket portions directly engage said housing exterior periphery.

8. A device as recited in claim 3 wherein said housing has relatively thin walls and further comprises a plurality of reinforcing ribs circumferentially extending around said housing central belt portion, and wherein said jacket portions directly engage said reinforcing ribs.

9. A device as recited in claims 1 or 4 wherein said screen means comprises a screen disposed interiorly of each of said through-extending pockets between the inlet and outlet of each of said pockets, and wherein said pockets are straight.

10. A device as recited in claim 9 further comprising means for mounting said device so that said axis of rotation of said rotor is substantially vertical.

11. A device as recited in claim 9 wherein each of said pockets is substantially wider at a middle portion thereof than at the inlets and outlets therefor, and wherein a said screen is mounted at the middle portion of each pocket.

12. A device as recited in claim 9 wherein said rotor contains two rows of diametrically through-going pockets, each row containing two through-going pockets perpendicular to each other, the two rows of pockets being parallel, with one row being 45° displaced peripherally from its adjacent row.

13. A method of continuously conveying hard particulate material, utilizing a high pressure transfer device including a pocketed rotor rotatable about an axis and containing a pair of diametrically through-going pockets perpendicular to each other, a housing enclosing the rotor and having four ports spaced around the external periphery thereof for registry with inlets and outlets to and from the through-going pockets in the rotor, and a screen associated with the housing and the rotor for allowing passage of liquid and particles smaller than a predetermined size therethrough, but preventing passage of particles larger than the predetermined size therethrough; the method comprising the steps of (a) continuously feeding liquid containing the hard particulate material into a first of the housing ports for entry into a through-going pocket of the rotor;

(b) rotating the rotor in a given direction of rotation, so that it progressively rotates past each of the housing ports;

(c) providing withdrawal of liquid introduced through the first port from through-going pockets of the rotor through a third port of the housing, opposite the first port, and screening the particulate material above a predetermined size out of the liquid passing through the third port with the screen;

(d) pumping liquid under high pressure toward the rotor through a fourth port of the housing, the fourth port being located before the first port in the direction of rotation of the rotor, and between the first and third ports;

(e) providing withdrawal of liquid, introduced through the fourth port, and entrained hard particulate material from a through-going pocket, through a second port, located opposite the fourth port; and (f) applying a radially inwardly directed force to the housing exterior periphery roughly proportional to and opposite a force tending to deflect the housing radially outwardly so that significant deflection of the housing is prevented.

14. A method as recited in claim 13 wherein step (f) is accomplished by applying a force to the housing exterior periphery proportional to the pressure of the liquid entering the housing fourth port.

15. A method as recited in claim 14 wherein the housing exterior periphery comprises a central belt portion and the housing walls are relatively thick; and wherein step (f) is further accomplished by applying the force directly to the housing external periphery at the central belt portion.

16. A method as recited in claim 14 wherein the housing exterior periphery comprises a central belt portion and the housing walls are relatively thin and a plurality of circumferential ribs extend outwardly from the housing external periphery at the central belt portion; and wherein step (f) is further accomplished by applying the force directly to the circumferential ribs.

17. A method as recited in claim 13 utilizing a plurality of screens comprising the further step of mounting a screen interiorly of each of the through-going pockets between the inlet and outlet of each pocket.

18. A method as recited in claims 13, 14, or 17 comprising the further step of mounting the high pressure transfer device so that the axis of rotation of the rotor is substantially vertical.

19. A method as recited in claim 18 comprising the further step of mounting the high pressure transfer device deeply underwater.

20. A method as recited in claim 18 wherein the pressure differential between the high and low pressure ports of the transfer device is about 50–100 bars.

21. A method as recited in claim 13 comprising the further step of mounting the high pressure transfer device deeply underwater.

22. A method as recited in claim 13 wherein the pressure differential between the high and low pressure ports of the transfer device is about 50–100 bars.

* * * * *